United States Patent
Kockott

[15] 3,664,188
[45] May 23, 1972

[54] APPARATUS FOR ACCELERATED TESTING OF THE LIGHT AND WEATHER RESISTING ABILITY OF DIFFERENT MATERIALS

[72] Inventor: Dieter Kockott, Rueckingen ueber Hanau, Germany

[73] Assignee: Original Hanau Quarzlamper GmbH

[22] Filed: Nov. 6, 1970

[21] Appl. No.: 87,640

Related U.S. Application Data

[63] Continuation of Ser. No. 734,770, June 5, 1968, abandoned.

[30] Foreign Application Priority Data

June 19, 1967 Germany ................. P 15 98 899.5

[52] U.S. Cl. .................................................. 73/150, 250/52
[51] Int. Cl. ............................................................ G01n 17/00

[58] Field of Search .............. 73/150, 432 SD; 250/42, 51, 250/52, 84, 85, 88

[56] References Cited

UNITED STATES PATENTS

| | | | |
|---|---|---|---|
| 3,224,266 | 12/1965 | Klippert | 73/150 |
| 3,340,397 | 9/1967 | Johnston | 250/52 |
| 1,827,530 | 10/1931 | Le Grand | 250/51 X |
| 1,969,606 | 8/1934 | Hall | 73/150 |

*Primary Examiner*—William F. Lindquist
*Attorney*—Otto John Munz

[57] ABSTRACT

An apparatus for accelerated testing of the radiation and atmosphere resisting ability of materials, having a radiation source and one or more gas-tight, radiation permeable containers in which material specimens may be irradiated and at the same time exposed to selected atmospheres at super ambient pressures.

4 Claims, 5 Drawing Figures

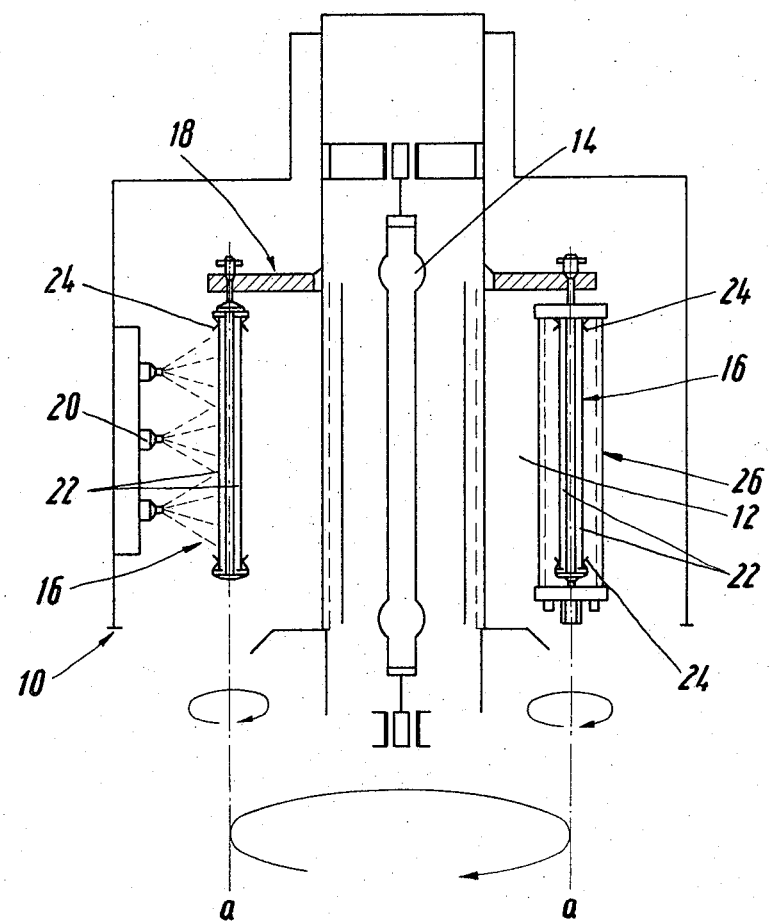

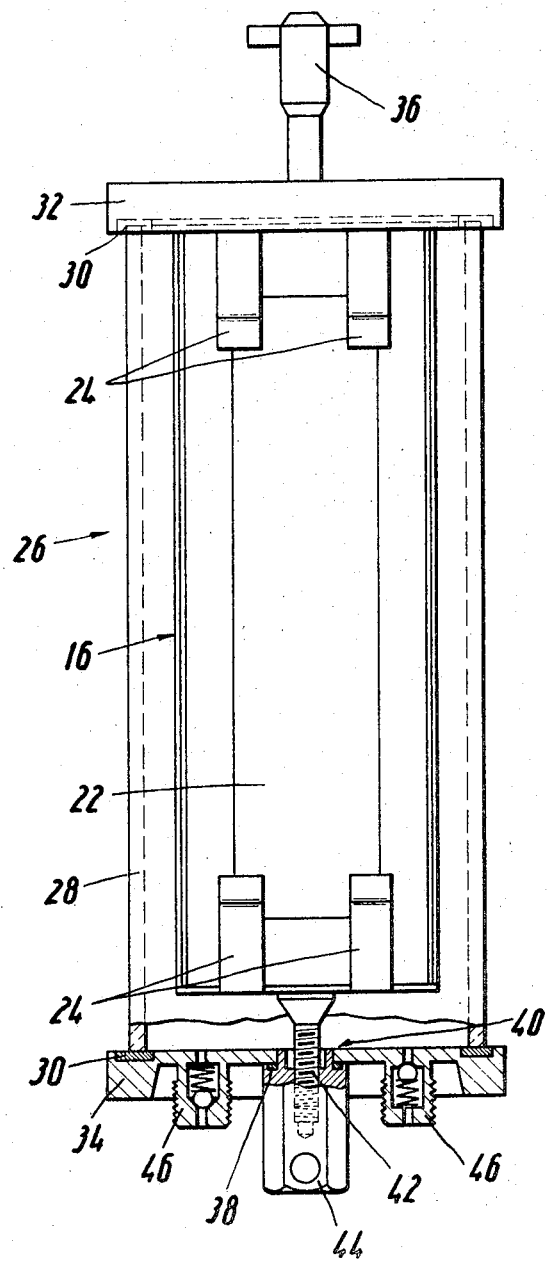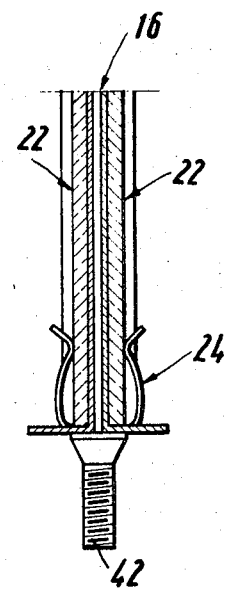

APPARATUS FOR ACCELERATED TESTING OF THE LIGHT AND WEATHER RESISTING ABILITY OF DIFFERENT MATERIALS

This application is a continuation of Ser. No. 734,770, filed June 5, 1968, now abandoned.

BACKGROUND OF THE INVENTION

This invention relates to apparatus for the accelerated testing of the sunlight and weather fastness of different materials, i.e., the resistance of these materials to the effects of sunlight and weather.

In order to be able to determine the light and weather fastness of substances such as paints, emulsions, and other materials more rapidly than is possible under natural conditions, testing devices of the prior art have employed centrally located artificial radiation sources. In these prior art devices, the artificial radiation sources are used as a substitute for normal sunlight. The intensity of these artificial radiation sources is made high enough so that the total radiant energy impinging on the test specimens in these devices during the course of one day is considerably greater than the total radiant energy which would impinge on the same specimens if they were exposed to ambient sunlight only, thus greatly accelerating the changes produced by irradiation.

Since materials in actual daily use are not only subject to the action of sunlight, but also to the action of the ambient atmosphere, i.e., to the effects of weathering, it is also necessary in these accelerated testing devices to provide means which subject the test specimens to the simulated effects of ambient atmospheres, i.e., to simulated weathering effects. For this reason, well-known testing apparatuses include both artificial radiation sources and means for subjecting the test specimens to selected atmospheric conditions, i.e., to simulated weathering conditions (see, for example, German Pat. DBP No. 1187401 or the corresponding U.S. Pat. No. 3,224,266 to Hans U. Klippert).

The artificial radiation source used in such devices may be an arc light or a zenon lamp having a spectral energy distribution in the visible and ultraviolet regions which is similar to that of ambient sunlight.

SUMMARY OF THE INVENTION

While these prior art devices have been helpful in reducing the time consumed in testing, the test results produced thereby have not been satisfactorily reproducible. For this reason, these prior art devices have been of limited usefulness in standardization and in comparing the effects of the same sunlight and weathering conditions on different materials. In particular, the test results produced by these devices have been of little value when high intensity irradiation of the test specimens was involved.

I have discovered, however, that useful test results may be obtained at high irradiation intensities, even exceeding the radiation intensities employed in the prior art, when gas-tight container means are employed so that the test specimens can be subjected to atmospheres having different properties than those of ordinary ambient atmosphere.

This discovery is utilized in a preferred embodiment of the present invention wherein one or more gas-tight test containers made at least in part of ray permeable material are disposed about the artificial radiation source, each container being provided with means whereby it can be filled with a selected gas, vapor, or mixture thereof at a selected pressure or whereby such a gas, vapor, or mixture thereof, at a selected pressure, can be passed through it.

According to one embodiment of the invention, a single gas-tight test container may be provided which is of a hollow cylindrical configuration, and this test container may be sub-divided into separate sections.

According to a preferred embodiment of the invention, a separate gas-tight container may be provided for each test specimen and these separate containers may be adapted to be mounted in known accelerated testing devices. Thus, known accelerated testing devices may continue to be used and only the test mounts or specimen carriers thereof need be modified.

It will now be appreciated that these embodiments of the present invention offer very great advantages over the devices of the prior art in which the whole test chamber, including the radiation source and all of the specimen carriers is sealed to permit the introduction of special atmospheres. In addition to permitting individual test specimens to be simultaneously subjected to the action of different atmospheres, and radically reducing the amounts of special atmospheric gases and vapors which must be employed, with the attendant advantage of reducing the time consumed in changing test specimens, and the pumping capacity necessary for effecting such changes, the present invention also eliminates the hazard of immersing the artificial ray source, which may both be hot and present exposed electrical connections, in the special atmosphere of the test chamber. This last feature of the present invention is of particular importance because the special atmospheres employed in carrying out the present invention will often comprise oxygen at pressures greater than those hitherto employed.

It is therefore an object of the present invention to provide improved light and weather fastness testing apparatus by means of which testing may be carried out at high irradiation intensities with reproducibility of test results greater than that hitherto achieved.

Other objects of the invention will in part be obvious and will in part appear hereinafter.

The invention, accordingly, comprises the features of construction, combinations of elements, and arrangements of parts, which will be exemplified in the constructions hereinafter set forth, and the scope of the invention will be indicated in the claims.

For a fuller understanding of the nature and objects of the invention, reference should be had to the following detailed description, taken in connection with the accompanying drawings.

BRIEF DESCRIPTION OF THE DRAWINGS

FIG. 1 represents a testing apparatus in which a test container according to the invention is mounted.

FIG. 2 represents a test container or chamber according to the invention.

FIG. 3 is a partial side view in section of the structure shown in FIG. 2.

DESCRIPTION OF THE PREFERRED EMBODIMENTS

Figure 5:
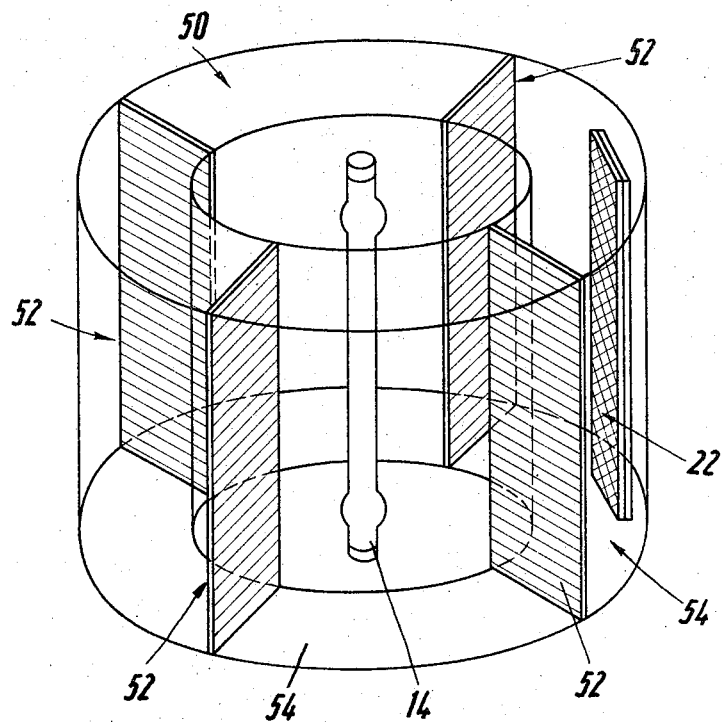
FIG. 5 illustrates in perspective an alternative embodiment of the invention wherein plural test chambers are incorporated in a single structure.

FIG. 1 illustrates a testing apparatus 10 of the prior art in which a test container according to the invention is mounted. Testing apparatus 10 includes a test chamber 12 along the axis of which is mounted an artificial radiation source 14, e.g., a zenon lamp. A plurality of test mounts 16 are detachably mounted on a ring or flange 18 which rotates about the axis of test chamber 12 and thus causes test mounts 16 to circulate around radiation source 14. Test mounts 16 are further caused to rotate 180° around their own axes during each cycle of circulation around radiation source 14 by means (not shown) the provision of which is within the scope of those having ordinary skill in the art.

Test chamber 12 is provided with means for producing desired atmospheric conditions therewithin, as exemplified by schematically indicated spray device 20.

Each test mount 16 is adapted to carry two test specimens 22, and is provided with spring clamps 24 for maintaining the test specimens in position.

A test container 26 according to the present invention is mounted in the right-most mounting position of flange 18, as shown in FIG. 1.

Referring now to FIGS. 2 and 3, the details of a test container embodying the present invention may be seen. Test container 26 comprises a radiation permeable member 28, such as a quartz glass cylinder, which is sealed by means of gaskets 30 to upper and lower flanges 32 and 34, respectively. The upper flange 32 is affixed to test mount 16 and has a hook or hanger 36 attached to its upper face whereby test container 26 may be mounted on flange 18 in the apparatus of FIG. 1. When test container 26 is assembled for testing, as shown in FIG. 2, an O-ring 38, adjacent hole 40 in lower flange 34, provides a gas-tight seal between lower flange 34 and a nut 44 which is threaded on a stud 42, stud 42 being fixed to the lower end of test mount 16. Test container 26 may be disassembled for reloading by removing nut 44 from stud 42, thus permitting lower flange 34 and radiation permeable member 28 to be removed, and further permitting test mount 16 to be reloaded in the usual way.

Two valves 46 are located in lower flange 34 and may be used for filling test container 26 with a suitable atmosphere at a selected pressure.

Figure 4:
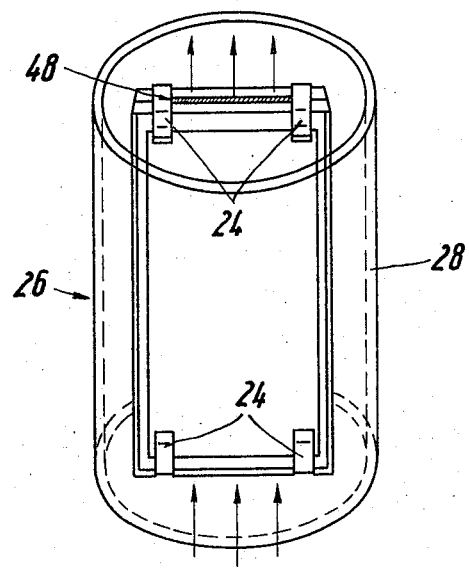
FIG. 4 represents an alternative form of test container according to the invention.

A modified form of test container 26 is shown schematically in FIG. 4. The difference between this form of test container and that of FIGS. 2 and 3 consists in the provision of means for cooling the specimens 22. This cooling means consists of a wall 48, mounted horizontally inside container 26. The wall 48 is sealed to the inside of container 26 and consists mainly of the rear walls of test mount 16. After connecting wall 48 to a coolant supply, cooling of the specimens may be brought about by circulating coolant between the specimens. Thus, the disadvantages which result from heating of the specimens due to intensive irradiation may be effectively reduced.

Yet another embodiment of the invention is shown schematically in FIG. 5, wherein a generally cylindrical container for specimens 22 is designated by the reference numeral 50. Container 50 surrounds radiation source 14, and defines a generally toroidal chamber. This generally toroidal chamber may be subdivided by partitions 52 into a plurality of single sections 54. Container 50, or its individual sections, may be filled with a suitable atmosphere, or with suitable liquids, by means analogous to the filling means used in the embodiment of FIGS. 2 and 3, or by other means which will occur to those having ordinary skill in the art. Means may be provided to rotate container 50 about radiation source 14, or, alternatively, container 50 may be maintained fixed and unrotated and the specimens within container 50 may be caused to execute cyclic movements.

The basic method of accelerated testing of the light and weather fastness of materials according to the present invention will now be described.

In testing with the open test mounts of the prior art the specimens cannot be irradiated at intensities greater than a certain limit because higher irradiation intensities produce results in many materials which deviate from the effects produced in those same materials by exposure to normal atmospheric conditions.

This deviation may be explained as follows. As a result of the absorption of photons during irradiation, organic molecules are broken down and radicals developed. These radicals are chemically very active and react readily with the available reactants in their surroundings. The main available reactant is oxygen from the air, which is not only available at the surface of the material under test, but also diffuses into the material under test. The rate at which these radicals react with available oxygen is determined by the quota or available volume of oxygen within the material under test, which is in turn limited by the diffusion of oxygen into the material under test. If in testing with the apparatus of the prior art having open test mounts the intensity of irradiation is raised above normal ambient levels, more radicals will develop per unit volume of material under test than will develop under natural ambient conditions. However, the rate at which these radicals react with available oxygen will necessarily remain the same, since the quota of available oxygen is fixed by diffusion, as pointed out above. Thus, when super ambient irradiation is undertaken in the accelerated testing devices of the prior art spurious reaction products will result which, under natural atmospheric influence, either would not be evolved at all or would be evolved only in small amounts, such as molecules of cancellated structure and molecular recombinations.

According to the present invention the quota of available oxygen may be increased in accordance with the number of molecules broken down as a result of irradiation. To bring about this increase in available oxygen the specimens 22 are mounted on a test mount 16 which then, in accordance with the principles of my invention, is sealed in a gas-tight container 26 which can be filled with oxygen at super ambient pressures. By raising the pressure of the oxygen within container 26 the rate of diffusion of the oxygen into the body of the test specimens may be increased, thus increasing the quota of available oxygen at the sites at which the radicals are evolved. By this application of the teachings of my invention, the ratio of available oxygen concentration to radical concentration may be maintained equal to that found in normal ambient conditions, even though the intensity of irradiation is greatly increased and the speed of testing therefore greatly accelerated. The test results obtained in accordance with my invention are not only obtained much more rapidly, but are also reliable and comparable with the results of much slower testing carried out in normal ambient conditions.

In addition to the advantages set out hereinabove, the apparatus according to my invention makes it possible to collect information which was not hitherto available regarding the changes which take place in the specimen during testing. That is to say, the test container 26 of my invention makes it possible to collect the accumulated gas reaction products evolved during testing for subsequent quantitative and qualitative analysis.

It will thus be seen that the object set forth above, among those made apparent from the preceding description, sufficiently attained, and, since certain changes may be made in the constructions without departing from the scope of the invention, it is intended that all matter contained in the above description or shown in the accompanying drawings shall be interpreted as illustrative, and not in a limiting sense.

It is particularly noted that although the above example of the application of my invention had reference to oxygen only, the test container of my invention can be filled with any combination of gases, vapors, or mixtures thereof, depending upon the constituents found to be present in actual ambient atmospheres. For instance, it may be desired to test the behavior of a material under exposure to so-called "industrial atmospheres" which include simulated constituents than pure air. Furthermore, it is possible, using the apparatus according to the invention, to test a specimen which is partially dipped in a liquid, the protruding portion of the specimen being exposed to an atmosphere which includes vapors of the liquid. In this way otherwise difficult to obtain conditions can be simulated, such as those encountered in ship painting, especially conditions occurring at the water line where materials are subject to steady alternation of salt water attack and atmospheric exposure. These alternating conditions cause rapid fatigue and require especially careful inspection. Such alternating conditions can be accurately simulate only with a container according to the invention. Finally, the device of the invention can also be used, in accordance with another aspect of the invention, to subject a specimen to a constant flow of any gas in order to test the characteristics of materials under such conditions. Additionally, the apparatus and methods of this invention may be combined with known apparatus and techniques such as the determination and control of the temperature and humidity of the specimen.

It is also to be understood that the following claims are intended to cover all of the generic and specific features of the invention herein described, and all statements of the scope of the invention which, as a matter of language, might be said to fall therebetween.

What is claimed is:

1. Apparatus for subjecting a plurality of test specimens to accelerated environmental testing comprising;
   a. a source of artificial sunlight,
   b. a ring member coaxially mounted for rotation about said source,
   c. means to rotate said ring member,
   d. a plurality of gas-tight test containers for holding the test specimens formed from radiation permeable material adapted to pass radiation from said source into said containers,
   e. valve means in each container for selectively filling and exhausting each container individually with a suitable test atmosphere, and
   f. support means for attaching each container to said ring member.

2. Apparatus as defined in claim 1 and further including a plurality of spring clamps within each test container to secure the test specimens.

3. Apparatus as defined in claim 1, and further including means to at least partially rotate each of said test containers with respect to said ring member.

4. Apparatus as defined in claim 1 wherein each of said containers is filled with a different gas.

* * * * *